(12) United States Patent
Nishimura et al.

(10) Patent No.: US 6,921,995 B2
(45) Date of Patent: Jul. 26, 2005

(54) MOTOR

(75) Inventors: Kiyoshi Nishimura, Nagano (JP); Yoshinori Ogawa, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/649,905

(22) Filed: Aug. 26, 2003

(65) Prior Publication Data
US 2004/0104633 A1 Jun. 3, 2004

(30) Foreign Application Priority Data
Aug. 30, 2002 (JP) ........................................ 2002-254196

(51) Int. Cl.[7] ............................. H02K 5/02; H02K 5/04; H02K 37/14
(52) U.S. Cl. ........................................ 310/89; 310/49 R
(58) Field of Search ......................... 310/40 MM, 49 R, 310/89

(56) References Cited

U.S. PATENT DOCUMENTS

| | | | | |
|---|---|---|---|---|
| 1,822,859 A | * | 9/1931 | Perkins | 310/68 R |
| 3,165,654 A | * | 1/1965 | Mabuchi | 310/46 |
| 3,445,692 A | * | 5/1969 | Kato | 310/42 |
| 4,467,231 A | * | 8/1984 | Biglino | 310/154.17 |
| 4,626,178 A | * | 12/1986 | Terumoto | 417/366 |
| 5,105,114 A | * | 4/1992 | Sickle et al. | 310/154.13 |
| 5,925,963 A | * | 7/1999 | Yang | 310/259 |
| 6,046,519 A | * | 4/2000 | Hanazumi et al. | 310/49 R |
| 6,541,886 B2 | * | 4/2003 | Mayumi | 310/91 |

FOREIGN PATENT DOCUMENTS

| | | | | | |
|---|---|---|---|---|---|
| JP | 08130846 A | * | 5/1996 | ............ | H02K/5/04 |
| JP | 11-27892 | * | 1/1999 | ............ | H02K/5/02 |

* cited by examiner

*Primary Examiner*—Burton Mullins
(74) *Attorney, Agent, or Firm*—Reed Smith LLP

(57) ABSTRACT

A motor comprises a casing made of magnetic material for housing a rotor and a coil wherein side surfaces of the casing have openings. The openings are closed by the magnetic plates that are thinner than the thickness of the material of the casing.

6 Claims, 5 Drawing Sheets

MOTOR

CROSS-REFERENCE TO RELATED APPLICATION

This application claims priority of Japanese Application No. 2002-254196, filed Aug. 30, 2002, the complete disclosure of which is hereby incorporated by reference.

BACKGROUND OF THE INVENTION a) Technical Field

The present invention relates to a motor. More specifically, it relates to the technology of thinning the casing of the (stepping) motor.

b) Description of the Related Art

FIGS. 1(A) and (B) illustrate a compact stepping motor 1 for use in a digital camera, digital video camera, and slim optical disk drive (ODD). Stepping motor 1 is generally constructed in the following manner: a circular first bobbin 5A wrapped with a coil and a second bobbin 5B (also wrapped with a coil) abut each other in the motor's axial direction; and a rotor securing hole is provided by first bobbin 5A and second bobbin 5B such that multiple poles of inner stators 2A, 2B and outer stators 3A, 3B are circumferentially arranged. Rotor 7 is secured around rotary shaft 71 fitted with rotor magnet 72. Rotor magnet 72, secured on the rotor securing hole, faces stator poles over a given space therebetween. Plate 8 is secured onto outer stator 3B to hold thrust bearing 82 which supports rotary shaft 71. Alternately, radial bearing 81, which is supported by plate 8, may support rotary shaft 71 as shown by the dotted line in FIG. 1A. Rotary shaft 71 is further supported by thrust bearing 82 arranged toward the first bobbin 5A end. Thrust bearing 82 is pressed against rotary shaft 71 by flat spring 83, which is cut and raised at the bottom of metallic cup-like cover 80 bonded to outer stator 3A. Terminals 50A, 50B are provided at the outer end of first bobbin 5A and second bobbin 5B in a radial direction such that the ends of the coils are terminated at terminal pins 51A, 51B of terminals 50A, and 50B. The circumferences of outer stators 3A, 3B constitute casing 2; and terminals 51A, 50B project through openings on casing 2.

Stepping motor 1 as configured above has cylindrical casing 2 whose cross section in a direction perpendicular to the plane of the motor axis is truly circular.

PROBLEMS ADDRESSED BY THE INVENTION

The market demands a thin stepping motor 1 that is short in a direction perpendicular to the motor's axial plane (flat on the radius plane). A conventional approach to thinning a stepping motor is to shrink the components in stepping motor 1. This conventional approach has a drawback in that it affects motor performance.

The applicant addresses this problem by providing an opening 20 by drilling the portion facing each other on side surfaces of casing 2 as illustrated in FIGS. 2(A), (B), (C) and (D).

Nonetheless, in the above configuration, a large amount of magnetic flux leaked from stepping motor 1 and moisture entered into stepping motor 1 through opening 20, deteriorating humidity resistance. The product could thus be used only under limited circumstances. Casing 2 itself is a part of the magnetic passage. Yet, when opening 20 is formed on casing 2, magnetic passages of different lengths tend to induce magnetic flux saturation, thereby affecting (consistency of) torque and delivery accuracy.

OBJECT AND SUMMARY OF THE INVENTION

Understanding the above problems, the primary object of the invention is to provide a vertically thin motor without mitigating motor performance.

More specifically, the present invention overcomes the problem by providing a motor having a casing made of a magnetic material for housing a rotor and a coil, and by further providing openings to ensure excellent magnetic properties. The present invention is also enhanced by closing the openings with magnetic plates that are thinner than the thickness of (the material of) the casing.

Since openings are provided on side surfaces of the casing in the present invention, the motor can be thinned vertically for the thickness of the casing (material). Magnetic plates close the openings. Nonetheless, these magnetic plates are thinner than the thickness of the casing (material), thereby providing room for vertical thinning thereof. Further, the magnetic plates have better magnetic properties than the casing, which assists magnetic passages maintaining an uniformity thereof against interruption derived from the openings. The opening—induced magnetic flux saturation is thus prevented. Moreover, since the openings are closed with magnetic plates, little magnetic flux will leak and moisture will not migrate into the motor, consequently resolving the safety issue.

In this invention, it is desirable that openings are provided on side surfaces facing each other in the casing.

The magnetic plates of the present invention are made of, for example, permalloy.

It is also desirable that the magnetic plates are provided with an extended portion and a spring for transmitting a force in the motor axial direction wherein the extended portion extends from the side surface of the casing bent along the bottom until it reaches the end of the rotor's rotary shaft; the spring made by cutting and raising a part of the extended portion. This configuration eliminates the need for attaching a cover having a spring at the bottom, consequently reducing the number of components required for assembling the motor and the height in the motor axial direction.

DESCRIPTION OF THE PREFERRED EMBODIMENTS

Figure 1:
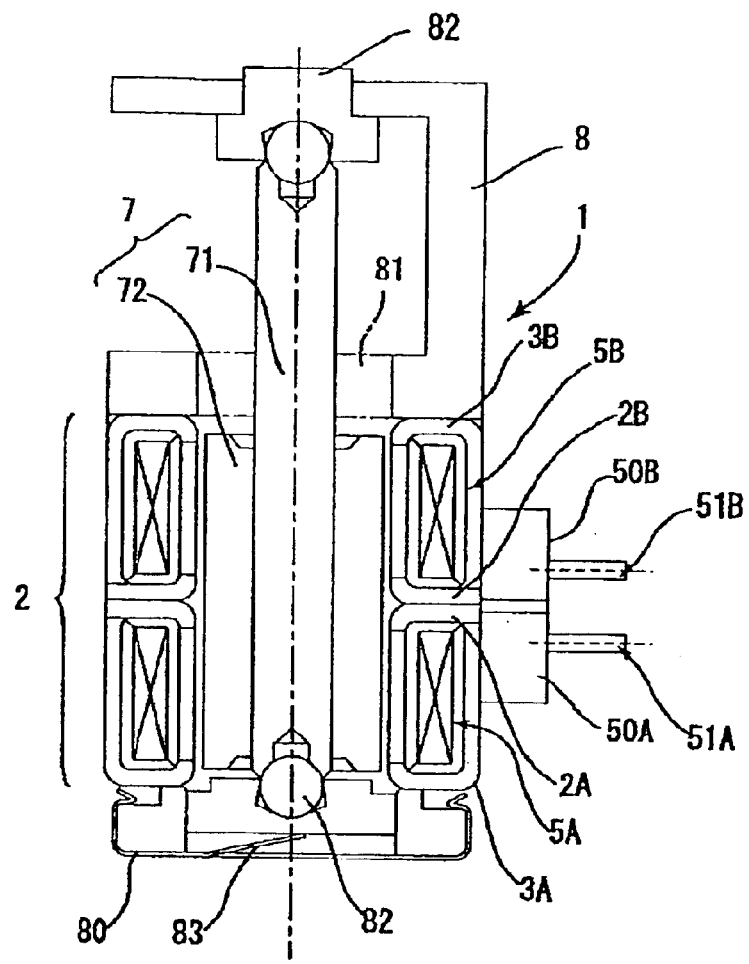
FIG. 1(A) is a cross section of the stepping motor adopting the present invention.
FIG. 1(B) is a bottom view of the stepping motor adopting the present invention.
Figure 1:
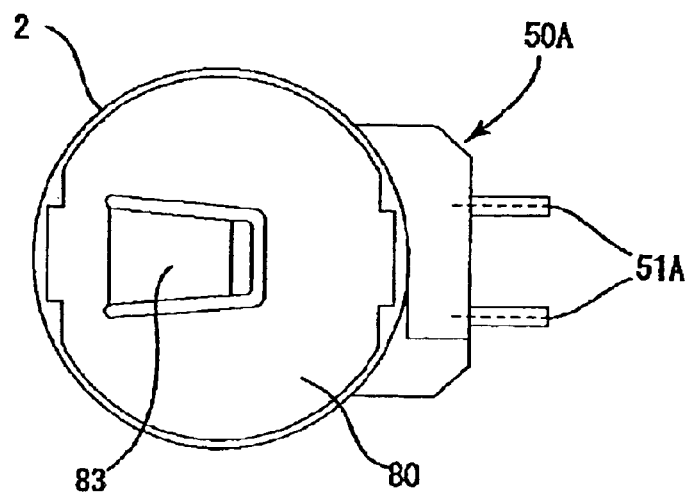

Embodiments of the present invention are described herein with reference to the drawings. The stepping motor adopting the present invention has the same configuration as that described with reference to FIG. 1(A). Therefore only notable characteristics of the motor of the present invention are described herein, and therefore, its details are eliminated.

Embodiment 1

Figure 2:
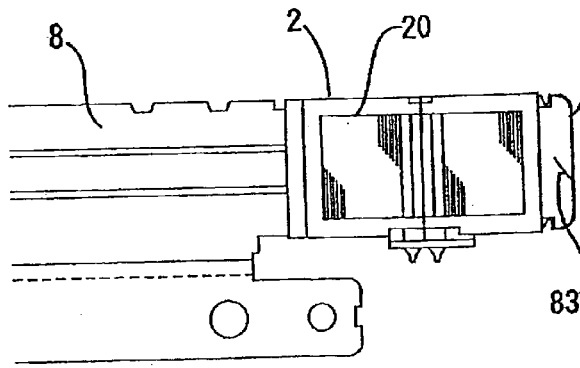
FIG. 2(A) is a left side view illustrating the stepping motor adopting the present invention wherein openings are provided on side surfaces of the casing.
FIG. 2(B) is a right side view.
FIG. 2(C), is a bottom view.
FIG. 2(D) is a cross section wherein the casing is cut along a plane perpendicular to the motor axis.
Figure 2:
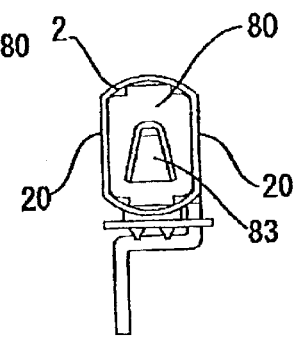
Figure 2:
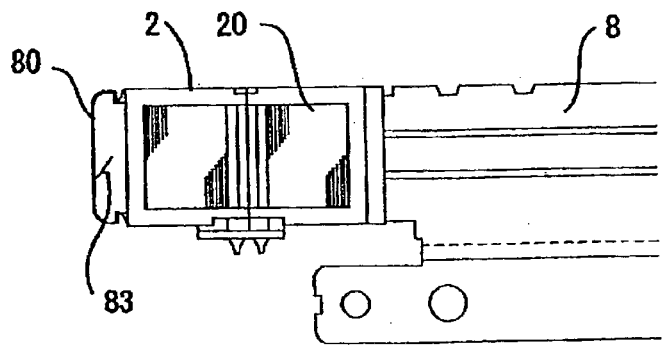
Figure 2:
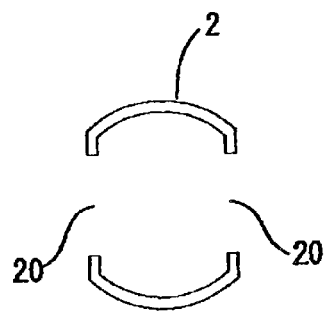
Figure 3:
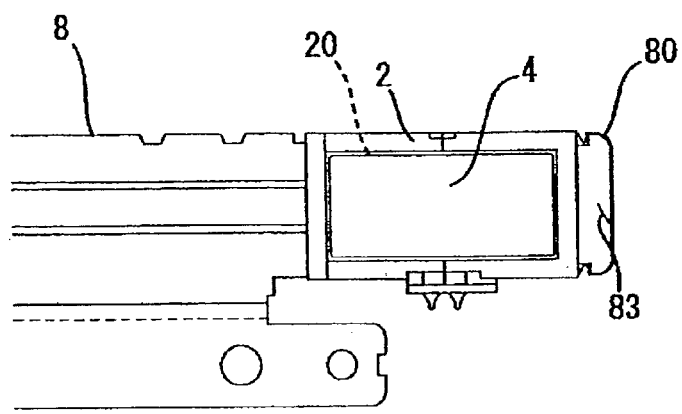
FIG. 3(A) is a left side view illustrating the stepping motor of Embodiment 1 of the present invention wherein magnetic plates cover openings provided on side surfaces of the casing.
FIG. 3(B) is a right side view.
FIG. 3(C), is a bottom view.
FIG. 3(D) is a cross section wherein the casing is cut along a plane perpendicular to the motor axis.
Figure 3:
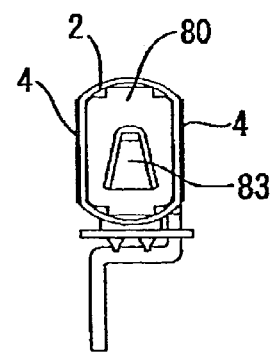
Figure 3:
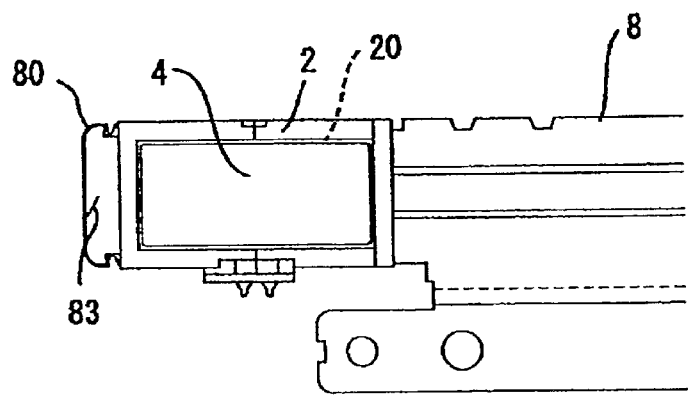
Figure 3:
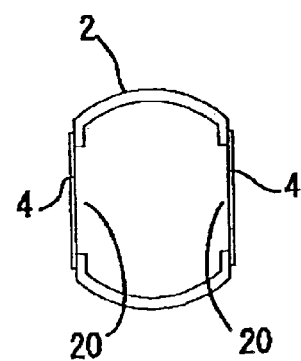

FIG. 2(A) is a left side view illustrating the stepping motor adopting the present invention wherein openings are provided on side surfaces of the casing; FIG. 2(B) is a right side view; FIG. 2(C), is a bottom view; and FIG. 2(D) is a cross section wherein the casing is cut along a plane perpendicular to the motor axis. FIG. 3(A) is a left side view illustrating the stepping motor adopting the present invention wherein magnetic plates cover the openings that are provided on side surfaces of the casing; FIG. 3(B) is a right side view; FIG. 3(C), is a bottom view; and FIG. 3(D) is a cross section wherein the casing is cut along a plane perpendicular to the motor axis.

In the stepping motor of this embodiment, as described with reference to FIG. 1(A), casing 2 is constructed with the circumferences of outer stator 3A, 3B. Inside casing 2, first bobbin 5A and second bobbin 5B both wrapped in coils are stacked against each other in the motor's axial direction and further, inside first bobbin 5A and second bobbin 5B, is arranged rotor 7 having rotary shaft 71 and rotor magnet 72.

In the stepping motor 1 of the above configuration of this embodiment, openings 20 are provided on the right and left side surfaces of casing 2, as a result, coils are exposed through openings 20 without closure as illustrated in FIGS. 2(A), (B), (C) and (D).

To resolve the problem, 0.1 mm thick permalloy magnetic plates 4 are bonded to casing 2 by means of welding or caulking as illustrated in FIGS. 3(A), (B), (C) and (D). Openings 20 are thus completely closed in these figures.

Here, casing 2 has a thickness of 0.3 mm. Even though permalloy magnetic plates 4 are thinner than the thickness of (the material of) casing 2, magnetic plates 4 have better magnetic properties than casing 2 because they are made of zinc-plated steel plate.

At the bottom of the casing, cup-like metallic cover 80 is attached to the bottom of casing 2 in this embodiment as well and spring 83 is provided at the bottom of cover 80 wherein spring 83 is made by cutting a part of the bottom and raising the cut part therefrom. Rotary shaft 71 of rotor 7 is thus pressed by spring 83 in the motor's axial direction as illustrated in FIG. 1(A).

As already described, openings 20 are provided on the sides of casing 2 in the stepping motor 1 in this embodiment. As a result, the motor can be vertically thinned for the thickness of (the material of) casing 2. Even though magnetic plates 4 close openings 20, magnetic plates 4 are thinner than the thickness of (the material of) casing 2; as a result the motor can be vertically thinned.

Further, magnetic plates covering openings 20 have better magnetic properties than casing 2. As a result, forming openings 20 on casing 2 does not produce magnetic passages of uneven length, thereby eliminating the possibility of inducing saturation of magnetic flux. Moreover, closing openings 20 with magnetic plates 4 prevents leakage of a large amount of magnetic flux through opening 20 and migration of moisture through opening 20, consequently eliminating safety issues.

Embodiment 2

Figure 4:
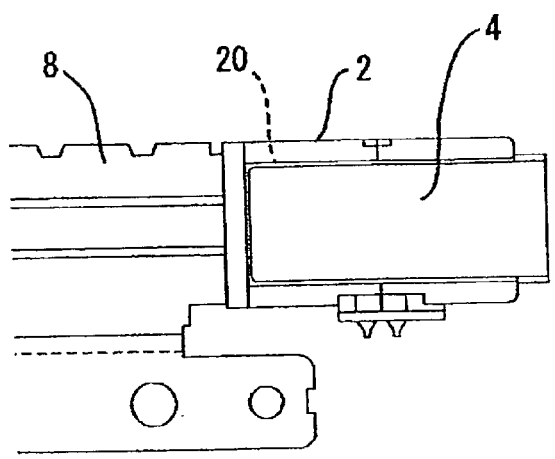
FIG. 4(A) is a left side view illustrating the stepping motor of Embodiment 2 of the present invention wherein openings are provided on side surfaces of the casing.
FIG. 4(B) is a right side view.
FIG. 4(C), is a bottom view.
FIG. 4(D) is a cross section wherein the casing is cut along a plane perpendicular to the motor axis.
Figure 4:
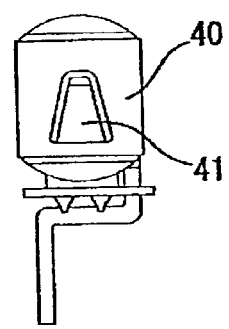
Figure 4:
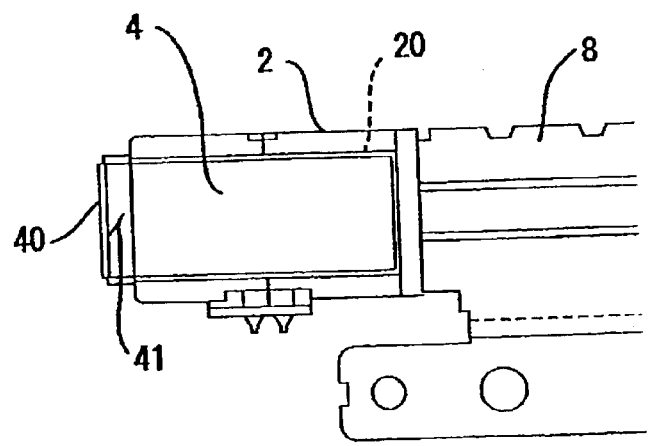
Figure 4:
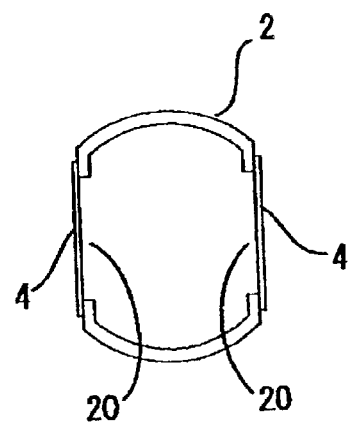

FIG. 4(A) is a left side view illustrating the stepping motor adopting the present invention wherein openings on side surfaces of the casing are covered with magnetic plates; FIG. 4(B) is a right side view, FIG. 4(C), is a bottom view, and FIG. 4(D) is a cross section wherein the casing is cut out along the plane perpendicular to the motor axis.

In the stepping motor of this embodiment too, as described with reference to FIG. 1(A), casing 2 is constructed with the circumferences of outer stators 3A and 3B. Inside casing 2, circular first bobbin 5A and second bobbin 5b both wrapped in coils are stacked against each other in the motor's axial direction; and inside first bobbin 5A and second bobbin 5B, rotor 7 having rotary shaft 71 and rotor magnet 72 are arranged.

As in the same manner as Embodiment 1, in the stepping motor 1 of this embodiment having the above configuration, openings 20 are provided on the right and left side surfaces of casing 2, as a result, coils are exposed through rectangular openings 20 without closure as illustrated in FIGS. 2(A), (B), (C) and (D).

To resolve the problem, 0.1 mm thick permalloy magnetic plates 4 are secured (bonded) to casing 2 by means of welding or caulking as illustrated in FIGS. 4(A), (B), (C), and (D). Openings 20 are thus completely closed by magnetic plates 4 in these figures. Here, casing 2 has a thickness of 0.3 mm. Even though permalloy magnetic plates 4 are thinner than the thickness of (the material of) casing 2, magnetic plates 4 have better magnetic properties than casing 2 because they are made of zinc-plated steel plate.

For this reason, openings 20 are provided at side surfaces of casing 2 in the stepping motor 1 in this embodiment as well. As a result, the motor can be vertically thinned for the thickness of (the material of) casing 2. Closure of openings 20 with magnetic plates 4 prevents motor properties from deterioration. The advantageous effects similar to Embodiment 1 are thus ensured.

Regarding the two magnetic plates 4, one of the magnetic plates 4 is provided with an extended portion in such a manner that the magnetic plate 4 extends from the side surface of casing 2, being bent at the bottom of casing 2, until it reaches the end of rotary shaft 71 of a rotor. On extended portion 40 is provided spring 41 for transmitting a force from rotary shaft 71 in the direction of the motor axis, wherein spring 41 is made by cutting a part of the extended portion 40 and raising the cut portion.

This embodiment eliminates the need for attaching cover 80 having a spring at the bottom (See FIGS. 1, 2, and 3), and consequently reduces the number of components required for assembling the motor and the height in the motor axial direction.

Embodiment 3

Figure 5:
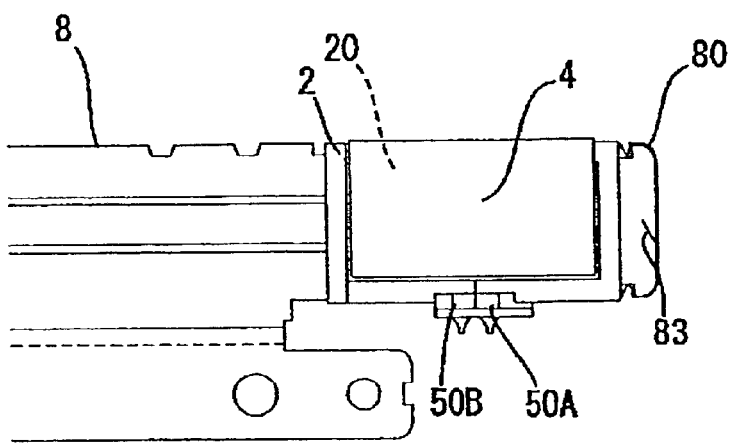
FIG. 5(A) is a left side view and FIG. 5(B) is a bottom view both illustrating the stepping motor of Embodiment 2 of the present invention wherein openings are provided on side surfaces of the casing covered by a magnetic plate.
Figure 5:
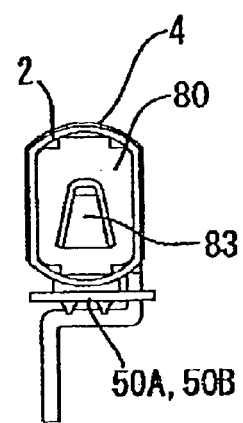

FIG. 5(A) is a left side view and FIG. 5(B) is a bottom view illustrating the stepping motor adopting the present invention wherein openings are provided on side surfaces of the casing are covered by magnetic plates.

In the stepping motor of this embodiment too, as described with reference to FIG. 1(A), casing 2 is constructed with the circumferences of outer stators 3A and 3B. Inside casing 2 are arranged circular first bobbin 5A and second bobbin 5b, both wrapped in coils, abutting each other in the motor's axial direction; inside first bobbin 5A and second bobbin 5B are arranged rotor 7 having rotary shaft 71 and rotor magnet 72.

As in the manner of Embodiments 1 or 2, the stepping motor 1 of the above configuration in this embodiment, openings 20 are provided on the right and left side surfaces of casing 2, as a result, coils are exposed through openings 20 without closure as illustrated in FIGS. 2(A), (B), (C) and (D).

To resolve the problem, 0.1 mm thick permalloy magnetic plates 4 are bonded to casing 2 by means of welding or caulking as illustrated in FIGS. 5(A) and (B). Openings 20 are thus completely closed by magnetic plates 4 in these figures. Here, casing 2 has a thickness of 0.3 mm. Even though permalloy magnetic plates 4 are thinner than the thickness of (the material of) casing 2, magnetic plates 4 have better magnetic properties than casing 2 because they are made of zinc-plated steel plate. In addition, magnetic plate 4 is a U-shaped member made by bending the plate so as to cover both openings of casing 2 in this embodiment.

Openings 20 are provided on side surfaces of casing 2 in the stepping motor 1 of this embodiment as well. As a result, the motor can be vertically thinned for the thickness of (the material of) casing 2. Closure of openings 20 with magnetic plate 4 prevents the motor properties from deterioration. The same advantageous effect as Embodiment 1 and 2 are thus ensured.

Since a piece of magnetic plate 4 closes two openings 20, there is no need to prepare a pair of plates 4 to separately fit each opening 2. A number of components required for assembling the motor are thus eliminated, improving productivity.

Alternate Embodiment

Magnetic plate 4 used in the above embodiments was made of permalloy, however, magnetic SUS or Si-steel plate may be used as long as it has better magnetic properties than casing 2.

Regarding magnetic plate 4, one may (strategically) determine the points of openings on casing 2 such that casing 2 is structurally enforced with magnetic plates 4 as magnetic plates 4 close openings. The overall strength of casing 2 is thus enhanced.

In the above embodiments, openings are provided on both end surfaces of casing 2 that are facing each other. However, only one opening 20 may be provided to be closed by magnetic plate 4.

Also in the above embodiments, openings 20 are provided on cylindrical casing 2 which are then closed by magnetic plates 4. However, one or more openings 20 may be formed on a prism shaped casing 2 to be closed by magnetic plates 4.

ADVANTAGEOUS EFFECTS OF THE INVENTION

Since openings are provided on side surfaces of the casing in the present invention, the motor can be thinned vertically for the thickness of the casing (material). Magnetic plates close the openings. Nonetheless, these magnetic plates are thinner than the thickness of the casing (material), thereby providing room for vertical thinning thereof. Further, the magnetic plates have better magnetic properties than the casing, providing magnetic passages of a uniform length even though openings are present. Opening-induced magnetic flux saturation is thus prevented. Moreover, since openings are closed with magnetic plates, little magnetic flux will leak and moisture will not migrate into the motor, consequently resolving safety issues.

While the foregoing description and drawings represent the present invention, it will be obvious to those skilled in the art that various changes may be made therein without departing from the true spirit and scope of the present invention.

What is claimed is:

1. A motor comprising:
   a casing made of a magnetic material for housing a rotor and a coil wherein side surfaces of said casing have openings;
   said openings being closed by magnetic plates that are thinner than the thickness of the material of said casing, the part of said magnetic plates facing the side surfaces being flat;
   wherein said magnetic plates are formed of a magnetic material having better magnetic properties than said casing such that the uniformity of the magnetic passage is maintained against the interruption derived from said openings.

2. The motor as set forth in claim 1 wherein said openings are provided at least on facing side surfaces of said casing.

3. The motor as set forth in claim 1 wherein said magnetic plates are made of permalloy.

4. The motor as set forth in claim 1 wherein said magnetic plates are provided with an extended portion and a spring for transmitting a force in the motor axial direction wherein said extended portion extends from a side surface of the casing and is bent along the bottom until it reaches the end of the rotary shaft of the rotor, said spring being made by cutting and raising a part of the extended portion.

5. A motor comprising:
   a casing made of a magnetic material for housing a rotor and a coil wherein side surfaces of said casing have openings;
   said openings being closed by magnetic plates that are thinner than the thickness of the material of said casing;
   wherein said magnetic plates are formed of a magnetic material having better magnetic properties than said casing such that the uniformity of the magnetic passage is maintained against the interruption derived from said openings;
   wherein said magnetic plates are provided with an extended portion and a spring for transmitting a force in the motor axial direction wherein said extended portion extends from a side surface of the casing and is bent along the bottom until it reaches the end of the rotary shaft of the rotor, said spring being made by cutting and raising a part of the extended portion.

6. The motor as set forth in claim 5 wherein said magnetic plates are made of permalloy.

* * * * *